United States Patent
Jansen et al.

(10) Patent No.: US 7,154,192 B2
(45) Date of Patent: Dec. 26, 2006

(54) ELECTRICAL MACHINE WITH DOUBLE-SIDED LAMINATION STACK

(75) Inventors: Patrick Lee Jansen, Alplaus, NY (US); James Patrick Lyons, Niskayuna, NY (US); Ralph James Carl, Jr., Clifton Park, NY (US); Ronghai Qu, Clifton Park, NY (US); James Michael Fogarty, Schenectady, NY (US); Bharat Sampathkumaran Bagepalli, Niskayuna, NY (US); Aniruddha Dattatraya Gadre, Rexford, NY (US); Jivtesh Garg, Schenectady, NY (US); Fulton Jose Lopez, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/951,329

(22) Filed: Sep. 27, 2004

(65) Prior Publication Data

US 2006/0066110 A1  Mar. 30, 2006

(51) Int. Cl.
*F03D 9/00* (2006.01)

(52) U.S. Cl. .................................... 290/55
(58) Field of Classification Search ............. 290/44, 290/55
See application file for complete search history.

(56) References Cited

U.S. PATENT DOCUMENTS

| | | | |
|---|---|---|---|
| 3,789,252 A | 1/1974 | Abegg | |
| 4,517,484 A * | 5/1985 | Dacier | 310/266 |
| 4,720,640 A * | 1/1988 | Anderson et al. | 290/43 |
| 4,761,590 A | 8/1988 | Kaszman | |
| 4,900,965 A * | 2/1990 | Fisher | 310/216 |
| 5,004,944 A * | 4/1991 | Fisher | 310/266 |
| 5,311,092 A * | 5/1994 | Fisher | 310/266 |
| 5,331,244 A * | 7/1994 | Rabe | 310/180 |
| 5,334,898 A * | 8/1994 | Skybyk | 310/268 |
| 5,977,684 A * | 11/1999 | Lin | 310/268 |
| 6,177,746 B1 * | 1/2001 | Tupper et al. | 310/166 |
| 6,462,457 B1 * | 10/2002 | Shah et al. | 310/259 |
| 6,590,312 B1 * | 7/2003 | Seguchi et al. | 310/266 |
| 6,664,692 B1 * | 12/2003 | Kristoffersen | 310/179 |
| 6,744,504 B1 * | 6/2004 | Yokota | 356/319 |
| 6,762,525 B1 | 7/2004 | Maslov et al. | |
| 6,774,527 B1 * | 8/2004 | Furuse et al. | 310/254 |
| 6,794,781 B1 * | 9/2004 | Razzell et al. | 310/114 |

(Continued)

FOREIGN PATENT DOCUMENTS

DE        4023791        7/1990

(Continued)

OTHER PUBLICATIONS

EPO Search Report dated Jan. 16, 2006.

(Continued)

*Primary Examiner*—Joseph Waks
(74) *Attorney, Agent, or Firm*—Ann M. Agosti; Roger C. Phillips; Patrick K. Patnode

(57) ABSTRACT

The machine includes a rotor with an inner rotor core and an outer rotor core and a double-sided stator with an inner stator side and an outer stator side. The double-sided stator is concentrically disposed between the inner rotor core and the outer rotor core of the wind turbine generator. The double-sided stator is configured to enable at least a portion of magnetic flux to be shared between the inner stator side and the outer stator side. Examples of particularly useful embodiments for the machine include wind turbine generators and ship propulsion motors.

13 Claims, 7 Drawing Sheets

U.S. PATENT DOCUMENTS

| | | | |
|---|---|---|---|
| 6,794,783 B1 * | 9/2004 | Tu et al. | 310/156.32 |
| 7,042,109 B1 * | 5/2006 | Gabrys | 290/44 |
| 2002/0047418 A1 | 4/2002 | Sequchi et al. | |
| 2003/0236036 A1 | 12/2003 | Varis | |
| 2004/0041409 A1 | 3/2004 | Gabrys | |

FOREIGN PATENT DOCUMENTS

| | | |
|---|---|---|
| DE | 4402184 C2 | 11/1995 |
| DE | 19643362 | 10/1996 |
| DE | 19704652 | 2/1997 |
| DE | 19636591 | 12/1999 |
| EP | 1375913 | 1/2004 |
| EP | 1394406 A2 | 3/2004 |
| EP | 1465326 A2 | 10/2004 |
| FR | 2823178 | 4/2001 |
| JP | 53015502 | 2/1978 |
| JP | 56053557 | 5/1981 |
| JP | 56-074075 | 6/1981 |
| JP | 56107767 | 8/1981 |
| WO | WO9939426 A1 | 8/1999 |
| WO | WO02/057624 A1 | 7/2000 |
| WO | WO 01/21956 A1 | 3/2001 |
| WO | WO 01/06623 | 1/2005 |

OTHER PUBLICATIONS

EPO Search Report dated Jan. 20, 2006.

Ronghai Qu, "Dual-Rotor, Radial-Flux, Toroidally Wound, Permanent-Magnet Machines", 2003 IEEE Trans on Industry Applications, vol. 39, No. 6, pp. 1665-1673.

US Patent Application, Entitled "Electrical Machine With Double-Sided Stator" By Patrick L. Jansen, et al., Sep. 27, 2004.

US Patent Application Entitled "Electrical Machine With Double-Sided Rotor" By Patrick L. Jansen, et al. U.S. Appl. No. 10/882,911 filed Jun. 30, 2004.

US Patent Application Entitled "Electrical Machines an Assemblies Including a Yokeless Stator With Modular Lamination Stacks", U.S. Appl. No. 11/014,137 filed Dec. 16, 2004.

Edward Spooner, et al, "Modular, Permanent Magnet Wind-Turbine Generators", 1996 IEEE, pp. 497-502.

* cited by examiner

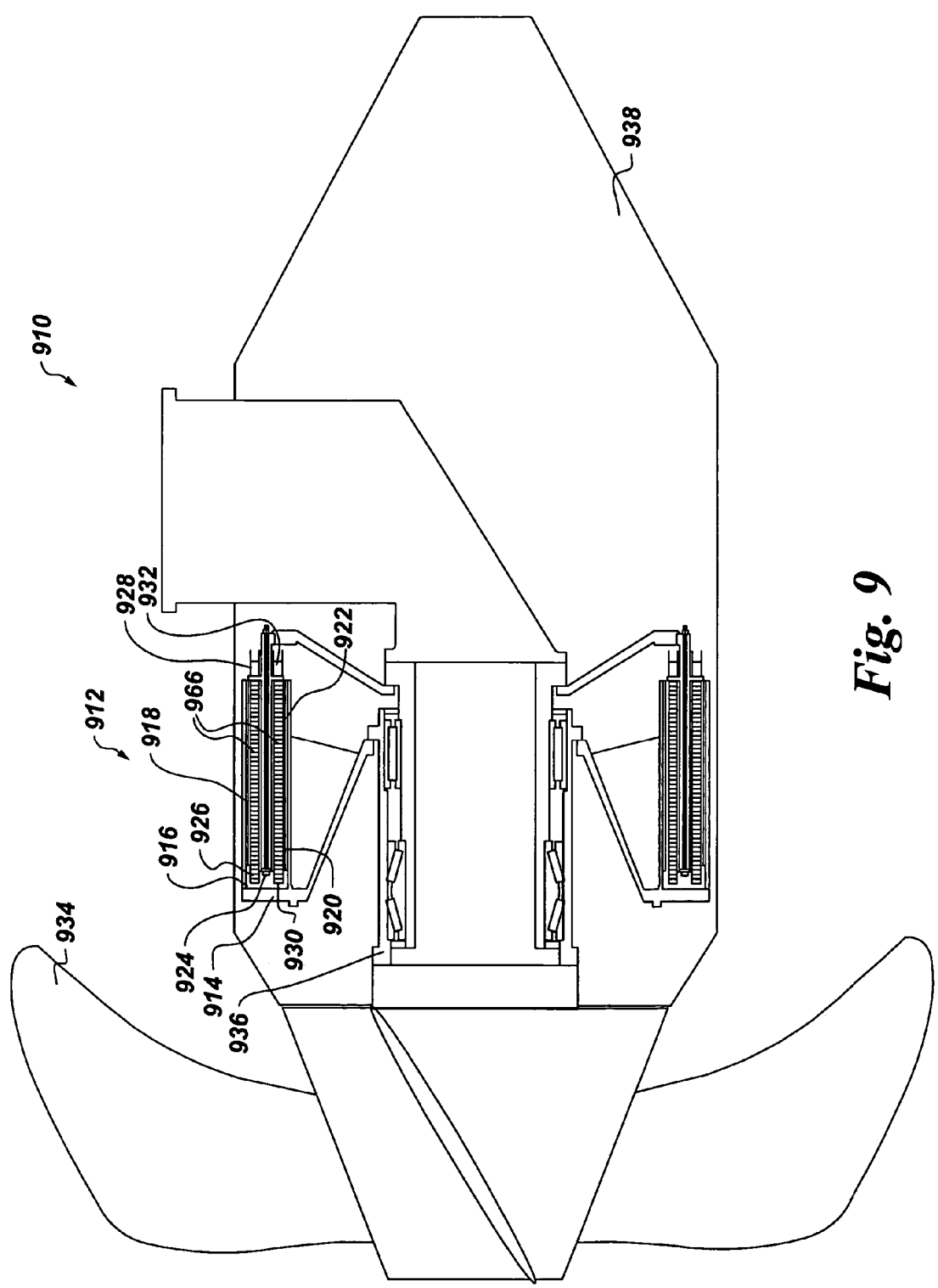

ELECTRICAL MACHINE WITH DOUBLE-SIDED LAMINATION STACK

CROSS REFERENCE TO RELATED APPLICATIONS

This application includes subject matter that is related to U.S. patent application Ser. No. 10/951,335, entitled "ELECTRICAL MACHINE WITH DOUBLE-SIDED STATOR", filed concurrently herewith, which is herein incorporated by reference.

BACKGROUND OF THE INVENTION

The present invention relates generally to wind turbine generators and ship propulsion motors.

Wind is usually considered to be a form of solar energy caused by uneven heating of the atmosphere by the sun, irregularities of the earth's surface, and rotation of the earth. Wind flow patterns are modified by the earth's terrain, bodies of water, and vegetation. The terms wind energy or wind power, describe the process by which the wind is used to generate mechanical power or electricity.

Typically, wind turbines are used to convert the kinetic energy in the wind into mechanical power. This mechanical power may be used for specific tasks (such as grinding grain or pumping water) or a generator may convert this mechanical power into electricity. A wind turbine usually includes an aerodynamic mechanism for converting the movement of air into a mechanical motion, which is then converted with a generator into electrical power. Power output from the generator is proportional to the cube of the wind speed. As wind speed doubles, the capacity of wind generators increases almost eightfold.

The majority of commercially available wind turbines utilize geared drive trains to connect the turbine blades to the wind generators. The wind turns the turbine blades, which spin a shaft, which feeds into a gear-box and then connects to a wind generator and makes electricity. The geared drive aims to increase the velocity of the mechanical motion. The drawback of a geared drive is that it reduces the reliability of the wind turbine and increases the noise and cost of the wind turbine.

A few wind turbines utilizing direct-drive generators are also commercially available. The large diameters of the direct drive generators present formidable transportation and assembly challenges, both at the factories and at the wind turbine installation sites. As the wind turbine industry matures and technology improves, larger power ratings will be required to continue the downward push in the cost of energy. Standard power ratings for land-based turbines are expected to be 3 MW or greater in the next few years, and the offshore turbines are expected to be 5 MW or greater.

For the wind turbines to evolve to higher power ratings, conventional approaches typically include an increase in the direct-drive generator diameter or axial (stack) length. Increasing the diameter is preferred from a purely generator electromagnetic perspective, but is not attractive from the transportation, frame, and assembly perspectives, especially for land-based turbines. Increasing the axial length of the generators, while maintaining the diameter to be less than approximately 4 meters, alleviates the land-based transportation issue, but results in complex and costly frame structures with long axial lengths.

It is therefore desirable to provide cost-effective wind turbines of increased power ratings and reduced diameters.

BRIEF DESCRIPTION OF THE INVENTION

Briefly, in accordance with one embodiment of the present technique, a wind turbine generator includes a rotor with an inner rotor core and an outer rotor core. The outer rotor core is inverted with respect to the inner rotor core, according to the aspects of present technique. The wind turbine generator also includes a double-sided stator with an inner stator side and an outer stator side. The double-sided stator is configured to enable all or a portion of magnetic flux to be shared between the inner stator side and the outer stator side.

In accordance with another aspect of the present technique, a ship propulsion motor is provided. The motor includes a rotor with an inner rotor core and an outer rotor core, and a double-sided stator with an inner stator side and an outer stator side. The inner stator side and the outer stator side include a double-sided lamination stack. The double-sided stator is concentrically disposed between the inner rotor core and the outer rotor core of the motor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 9 illustrates a portion of an exemplary ship propulsion motor with a double-sided lamination stack for the double-sided stator in accordance with aspects of present technique.

DETAILED DESCRIPTION OF THE INVENTION

The present invention includes different embodiments for double-sided generators that are particularly useful for direct-drive wind turbines and ship propulsion motors. The different direct-drive configurations for wind turbines described herein below are based upon a double-sided, radial-flux, synchronous electrical machines. Although permanent magnet (PM) machines are described and shown for the purpose of illustration, other electrical machines such as wound field synchronous machines can alternatively be used. These configurations contribute towards achieving cost-effective wind turbines of increased power ratings (>2.0

MW) and are especially advantageous for land-based applications where the outside diameter may be constrained by transportation limitations.

Figure 1:
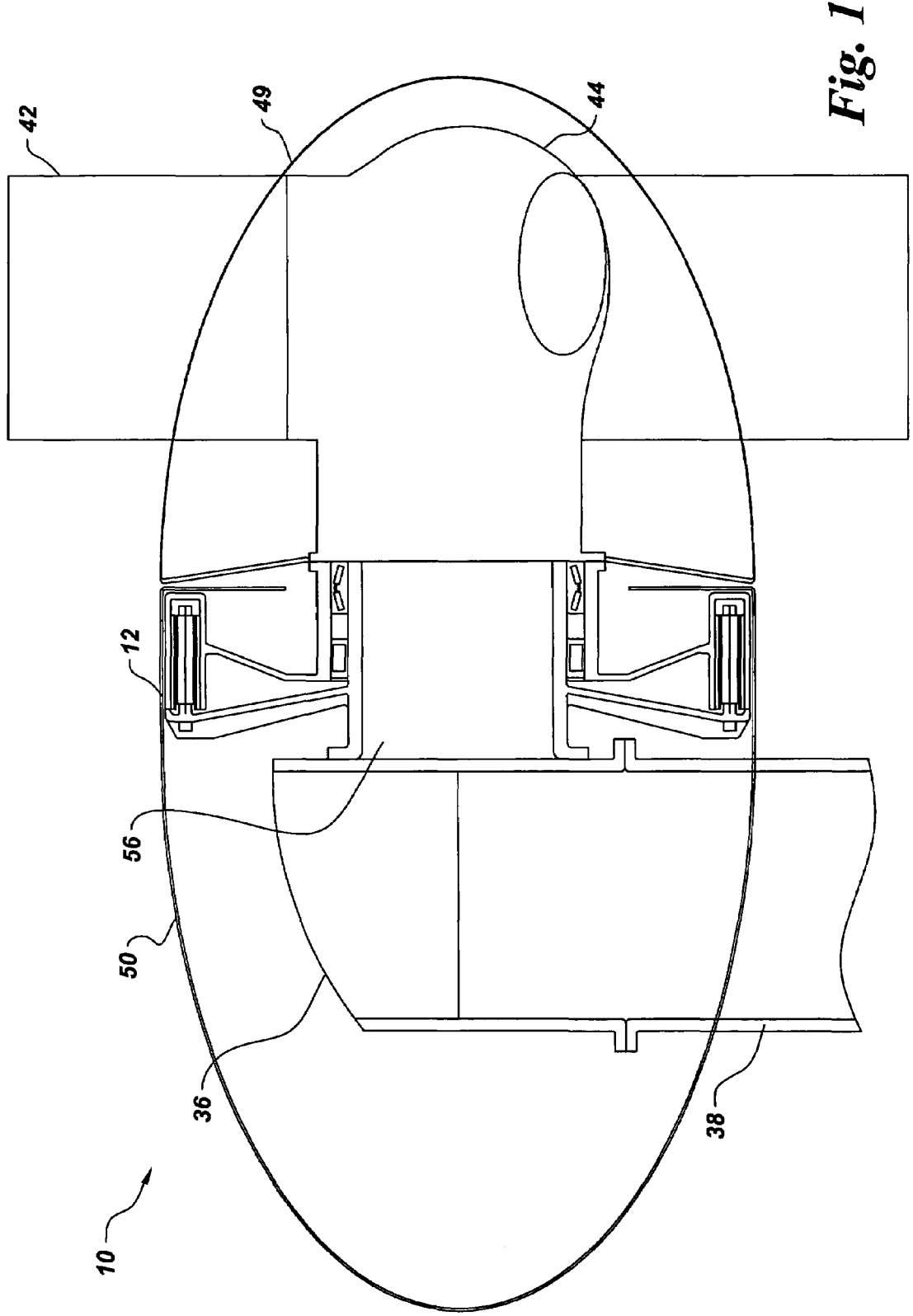
FIG. 1 illustrates a sectional view of a wind turbine including an exemplary direct-drive double-sided permanent magnet (PM) generator according to aspects of the present technique.

Turning now to the figures, FIG. 1 is a diagrammatic representation of a sectional view of a wind turbine 10 with an exemplary embodiment of a direct-drive double-sided PM generator 12. The PM generator 12 of the wind turbine 10 includes at least two concentric air gaps (not shown in FIG. 1 and discussed later in reference to FIG. 2), thereby effectively converting the PM generator 12 into two concentric generators. Thus, it would be appreciated by those skilled in the art that for the same total envelope defined by the outside diameter and axial length, the PM generator 12 can produce considerably more power output than as a single-sided generator. In practice, thus a 2 MW single-sided generator might be replaced by a double-sided generator capable of producing 3–3.6 MW for the same total diameter and axial length. Equivalently, a 3 MW single-sided PM generator having a diameter of 6 meters might be replaced with a double-sided generator of the same axial length with only a 4.3 meter diameter, thereby enabling land-transportation of the entire generator as one unit.

Referring again to FIG. 1, the PM generator 12 is mounted on a nacelle main frame 36 via a main shaft and bearing assembly 56. The nacelle main frame 36 is further mounted to a tower 38 through a conventional yaw bearing and gear drive system (not shown). More detailed features of the PM generator 12 are described herein below with reference to FIG. 2. A rotor blade hub 44 connects the wind turbine rotor blades 42 to the PM generator 12. A rotor hub cover 49 contains the wind turbine rotor blades 42 and other turbine rotor components. A nacelle cover 50 is also provided and it typically protects the components inside the nacelle from the environment.

Figure 2:
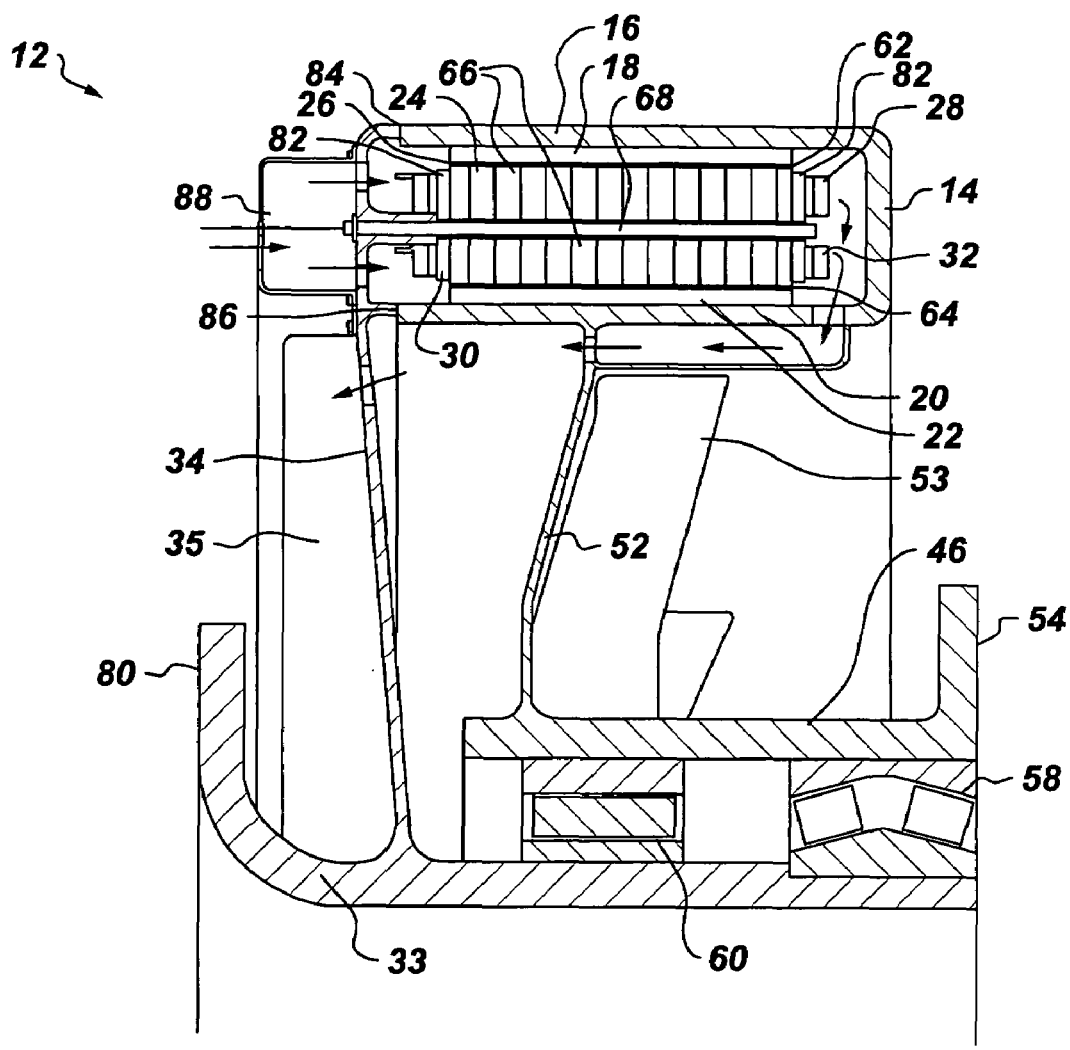
FIG. 2 illustrates a sectional view of a direct-drive double-sided flux-sharing PM generator of FIG. 1.

FIG. 2 illustrates a sectional view of a direct-drive double-sided flux-sharing PM generator of FIG. 1. The PM generator 12 includes a rotor 14 (generator rotor) with an outer rotor core 16 with outer permanent magnets 18 and an inner rotor core 20 with inner permanent magnets 22. The outer rotor core 16 is inverted with respect to the inner rotor core 20. The permanent magnet generator 12 also includes a double-sided stator 24 with an outer stator side 26 with an outer stator winding (coils) 28 and an inner stator side 30 with inner stator winding (coils) 32. It will be well understood by one skilled in the art that the stator 24 is concentrically disposed between the outer rotor core 16 and the inner rotor core 20. The outer stator side 26 and the inner stator side 30, thus contribute to the at least two concentric air gaps 62, 64 (the inner stator side 30 and the inner rotor core 20 define an inner air gap 64 and the outer stator side 26 and the outer rotor core 16 define an outer air gap 62). In a specific embodiment as illustrated in FIG. 2, the outer and inner stator sides 26 and 30 are typically constructed of a single double-sided lamination stack 66 that is bolted axially by axial bolts 68 to the stationary frame 34. Steel coreplates 82 between both sides of the lamination stack 66 and the heads of the axial bolts 68 provide uniform compression of the stack from the axial bolts 68. The double-sided stator 24 is thus configured to enable at least a portion (and in some embodiments all) of the magnetic flux to be shared between the inner stator side 26 and the outer stator side 30.

Optional outer rotating seal 84 located between the stationary frame 34 and the rotor 14 provides further protection of the components of the double-sided stator 24 and rotor 14 from the environment. An optional inner seal 86 provides sealing between the stator and rotor components and the corresponding frame structures 34 and 52. The seals are preferably of a labyrinth or brush-type seal.

In operation, the power output of the double-sided stator 24 is controlled by a power converter unit (not shown) capable of full power conversion. The stator 24 is connected to a stationary frame 34, which may include structural stiffening members or ribs 35. A rotor shaft 46 connects to the rotor 14 via a rotating frame 52 at one end and to the rotor blade hub flange 54 on the other end, which connects to a turbine rotor blade hub (44 in FIG. 1). The rotating frame 52 may also include structural stiffening members or ribs 53. The generator rotor shaft 46 is mounted on a bearing assembly, consisting of two main bearings, front main bearings 58 and rear main bearings 60. Although two main bearings are illustrated, alternative bearings configurations, including a single main bearing, are possible. The bearings are mounted on a stationary inner shaft 33, that mounts to the nacelle main frame 36 via main frame flange 80. It will be appreciated by those skilled in the art, that the main bearing and shaft diameters may be sized accordingly with the means for hub access; e.g., larger-diameter main bearings (about 1.5 meters or more, for example) would facilitate hub access. The use of lower-cost small diameter bearings less than or equal to about 1.0 meter, for example, would likely require hub access through access port(s).

Figure 3:
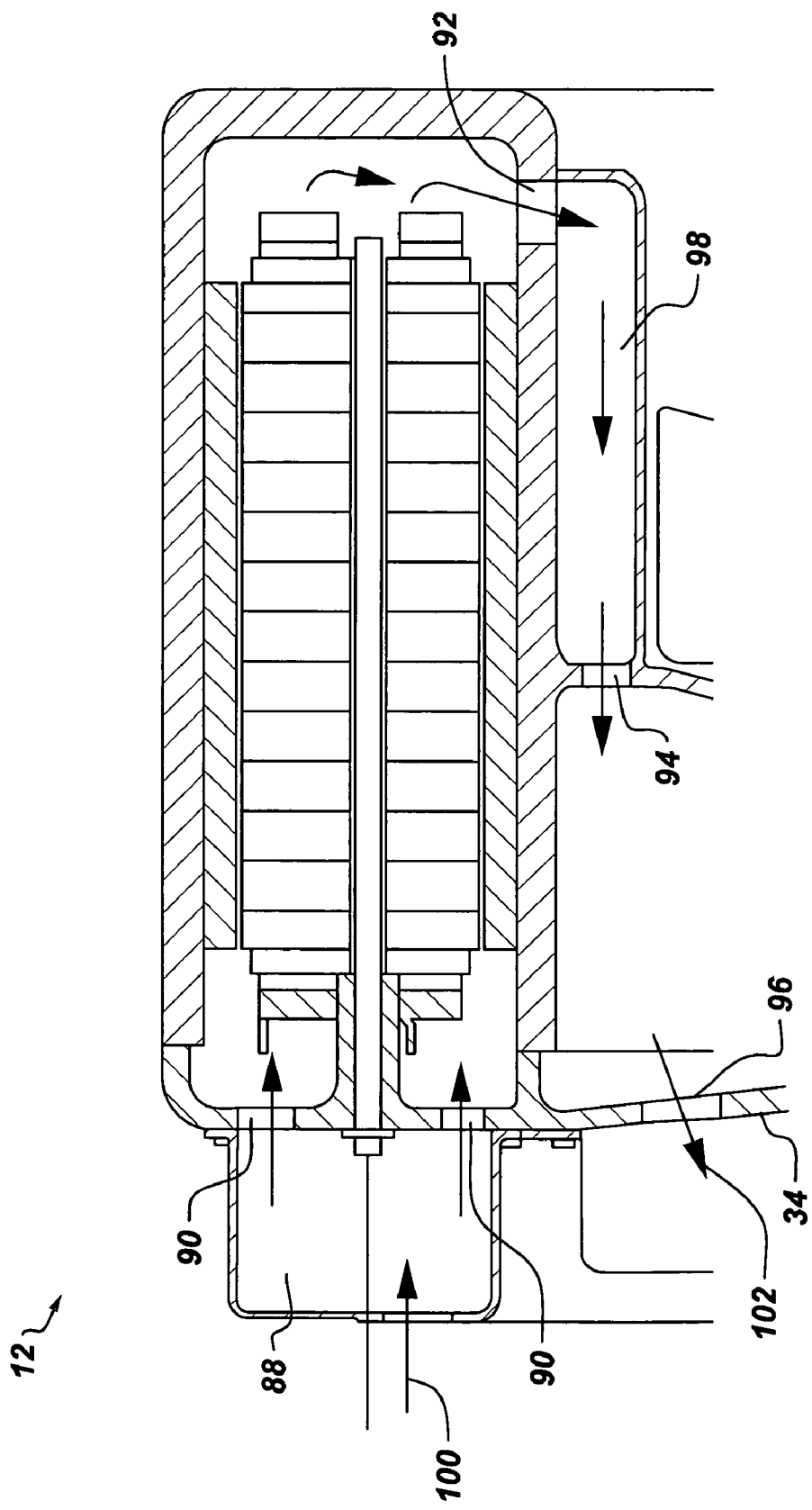
FIG. 3 illustrates a close up view of the direct-drive PM generator of FIG. 2 with the air cooling passages.

FIG. 3 is a detailed side-sectional view of an air-cooled arrangement in the double-sided flux sharing PM generator 12 of FIG. 2. As illustrated, a plenum 88 is attached to the stationary frame 34 of the PM generator 12. Through the plenum 88 cooling ducts 90 are provided into the stator and rotor. The air passages as described hereinafter describe the flow of air in the cooling duct. The cooling air is passed axially through the cooling duct in the double-sided stator. The cooling duct may be located between at least two adjacent stator coils of a respective stator slot for passing of the cooling air (as shown by passages 112 and 114 in FIG. 6). A cooling air passage 92 depicts the exit of cooling air from the stator and rotor into a cooling air passage inlet 94 through the rotor frame and a cooling air passage inlet through the stationary frame 34. Additionally a sealed passage 98 may be provided for passage of cooling air through the rotor frame. An inlet 100 and an exhaust 102 are provided for the cooling air in the above arrangement. Note that alternative air flow paths are possible, including air flow in the reverse direction from illustrated.

Figure 4:
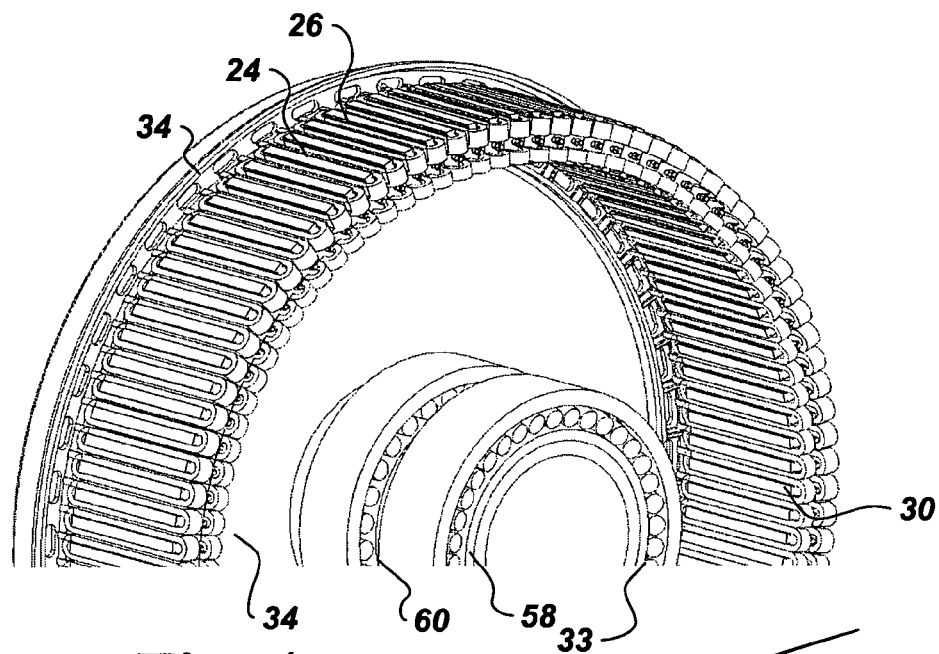
FIG. 4 illustrates a sectional view of a double-sided stator of the PM generator useful for the embodiments of FIGS. 1–3.

FIG. 4 is a sectional view of double-sided stator 24 with outer stator side 26 and the inner stator side 30 disposed about the stationary frame 34. FIG. 4 also illustrates the front main bearings 58 and the rear main bearings 60 and the stationary shaft 33.

Figure 5:
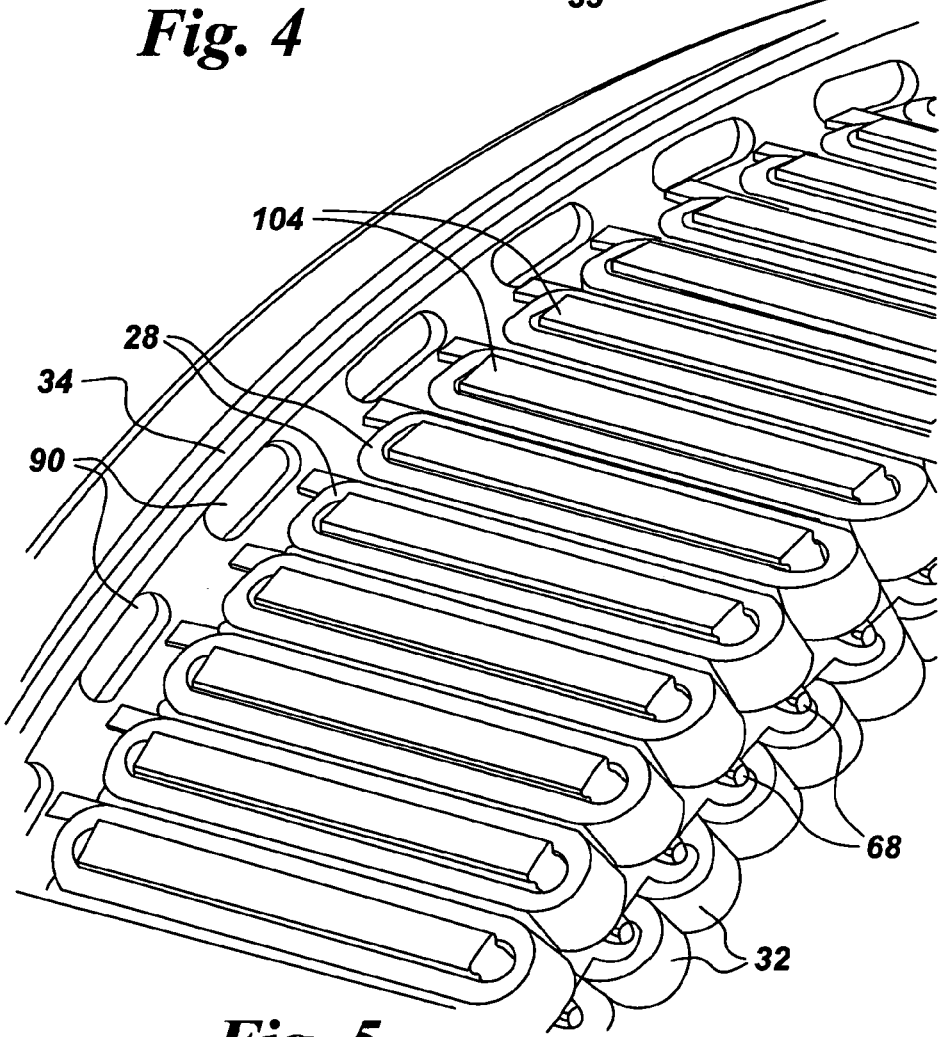
FIG. 5 illustrates a close-up view of the double-sided stator of FIG. 4.
Figure 6:
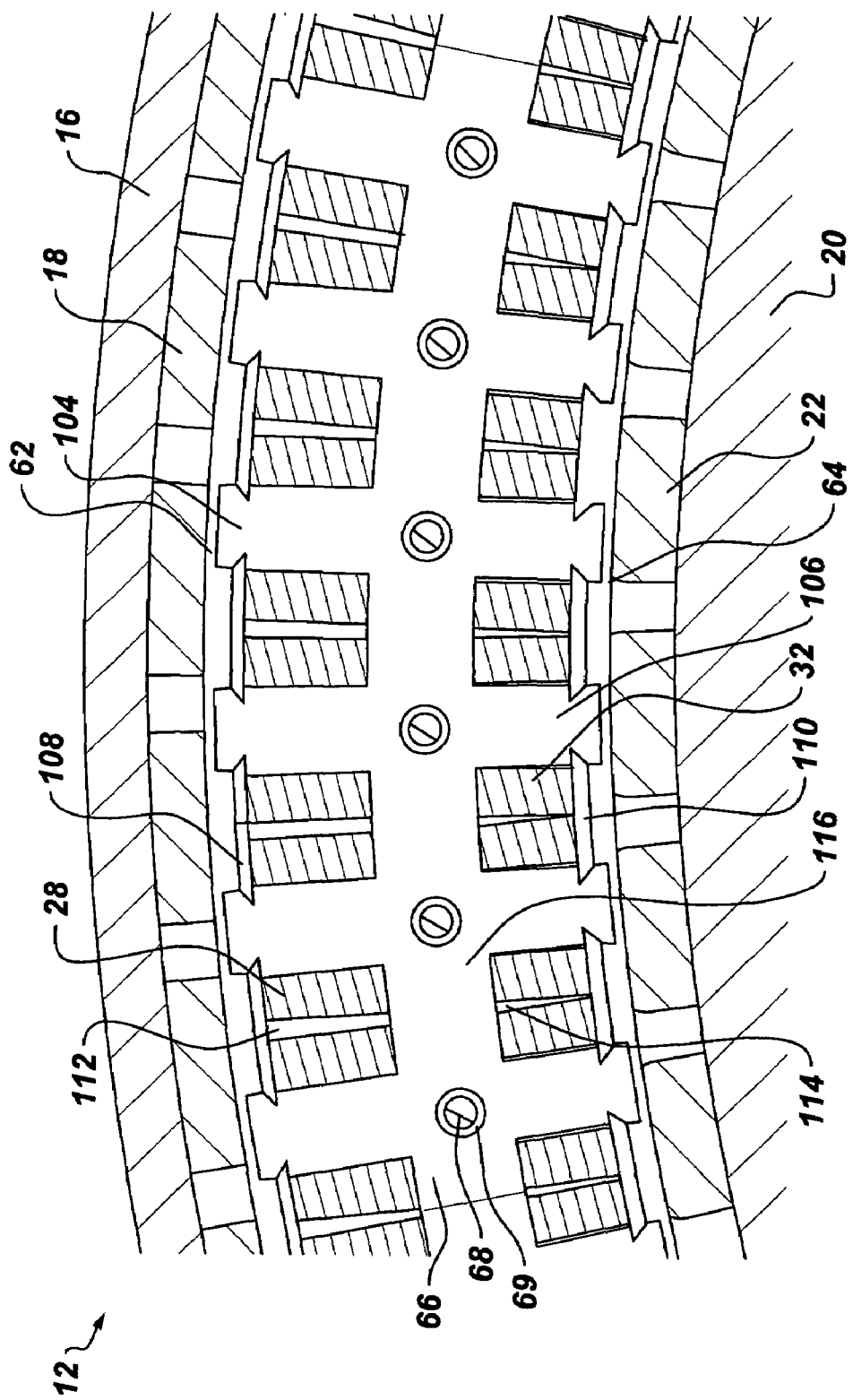
FIG. 6 illustrates a cross-sectional view of the double-sided stator and inner and outer rotors.

FIG. 5 is a close-up view of the double-sided stator of FIG. 4 disposed about the stationary frame 34 and showing the outer stator windings (coils) 28, inner stator windings (coils) 32, axial bolts 68 and outer stator tooth (teeth) 104. Air cooling passage 90 is also shown which allows the cooling air to flow into the double-sided stator and rotor FIG. 6 is a cross-sectional view of the double-sided stator and inner and outer rotors. The illustration shows the outer rotor core 16 with outer permanent magnets 18 and an inner rotor core 20 with inner permanent magnets 22. The outer and inner stator tooth (teeth) are denoted generally by reference numerals 104 and 106 respectively and the outer stator winding (coils) 28 and the inner stator winding (coils) 32 are retained respectively by the outer stator coil retaining wedge 108 and inner stator coil retaining wedge 110. The double-sided stator as described herein above contributes the outer air gap 62 and inner air gap 64. The structural integrity of the stator is achieved through compression of the lamination stack 66, via numerous axial bolts 68 located in the stator yoke 116. The bolt bodies (shafts) (not shown) and at least one end are insulated from the laminations and frame structures to avoid induced electrical currents and resulting losses and heating. In one example, at least one bolt per slot is used; e.g., with bolt holes 69 as illustrated in FIG. 6. It would be appreciated by those skilled in the art that the bolt hole positions may vary. In a specific example the bolt hole positions may be aligned with stator teeth. Also illustrated are cooling air passages as described herein above, the cooling air passage 112 between outer stator windings and the cooling air passage 114 between the inner stator windings.

Figure 7:
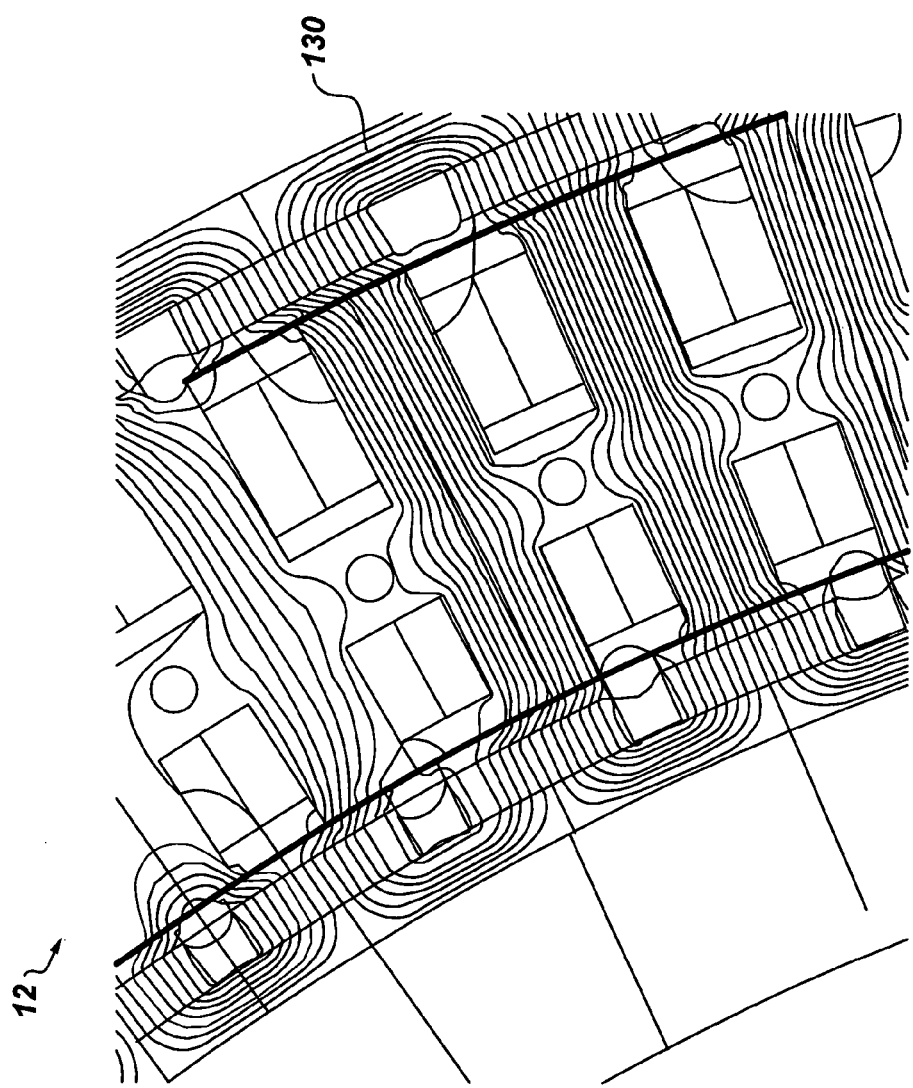
FIG. 7 illustrates the magnet flux paths in the double-sided stator and inner and outer rotors at one instant of time.

FIG. 7 illustrates the shared magnet flux paths or flux lines 130 which flow radially in the double-sided stator and permanent magnets, and flow predominantly circumferentially in the inner and outer rotor core of the PM generator 12 at any one instant of time. As described earlier the single stator lamination stack enables the flux sharing as illustrated in FIG. 7.

Figure 8:
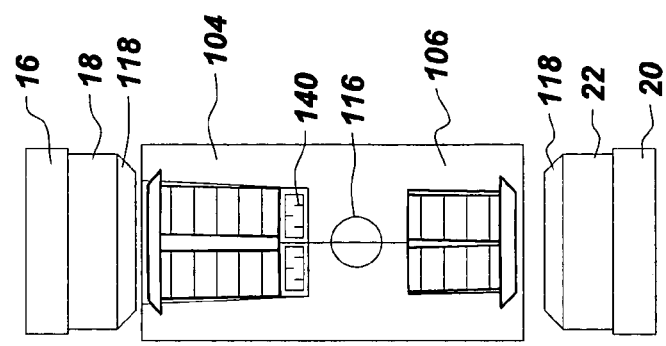
FIG. 8 illustrates an exemplary embodiment with liquid cooling channels in the arrangement of FIG. 2.

FIG. 8 illustrates a stator and rotor cross-section with an exemplary arrangement for liquid cooling in the double-sided stator. In one example a liquid cooling channel 140 (or cooling duct) may be placed adjacent to the outer stator tooth 104. Liquid cooling channel 140, in one example is placed in the bottom of the slots formed between the outer stator tooth 104. The liquid used is typically at least one of water-glycol and de-ionized water, but any other liquid commonly used for cooling of electric machines may be used. Cooling channel 140 may be of any material used commonly for manufacturing cooling pipes, for example but not limited to aluminum, copper, stainless steel or any combination thereof. Cooling channel 140 may be connected in a range of series and parallel connections with one or multiple circuits. A heat exchanger (not shown) may be used to transfer the heat absorbed in the cooling liquid to the ambient air. Liquid cooling is advantageous since it provides a more compact machine that may be totally enclosed for protection from the environment. In particular, in the examples of liquid cooling described above, the net stator core thickness is reduced compared to an air or wind cooled design. It therefore enables the diameter of the inner air gap 64 (FIG. 2) to increase, thereby enabling increased power capability of the PM generator 12 for the same total outside diameter and axial length.

Also illustrated in FIG. 8 are pole caps 118 that are attached to each of the air-gap-facing surfaces of the inner and outer permanent magnets, 22 and 18, respectively. The pole caps are preferably of a high-resistivity, ferromagnetic, material such as a soft-magnetic-composite or bonded lamination stack. The pole cap provides mechanical protection to the permanent magnets, reduced rotor (magnet) losses, and also protection from demagnetization during fault conditions. The use of the pole caps 118 is not limited to liquid cooling, but may also be used in the prior PM generator embodiments illustrated in FIGS. 1–7.

It would be appreciated by those skilled in the art that other cooling techniques such as but not limited to forced-air cooling similar are also equally applicable.

The double-sided generator 12 as described in different embodiments hereinabove, offers several advantages over single-sided generators for wind turbines. The most significant advantages include reduced manufacturing and assembly costs, reduced stator mass, reduced machine outer diameter (thereby enabling land-transportation), and improved balancing of radial magnetic forces.

Although embodiments of the present invention have been described primarily in terms of wind turbines, the concepts are additionally useful in other applications with one example being ship propulsion motors. FIG. 9 illustrates a sectional view of a portion of a ship propulsion pod unit 910 comprising an exemplary double-sided ship propulsion motor 912, a propeller 934, a mounting and bearing assembly 936, and a frame assembly 938. The ship propulsion motor 912 includes a rotor 914, including an outer rotor core 916 with outer permanent magnets 918 and an inner rotor core 920 with inner permanent magnets 922. The motor 912 also includes a double-sided stator 924 with an outer stator side 926 with an outer stator winding 928 and an inner stator side 930 with inner stator windings 932. The double-sided stator includes a double-sided lamination stack 966 and is concentrically disposed between the inner rotor core and the outer rotor core of the ship propulsion motor. The double-sided lamination stack is configured to enable the magnetic flux to flow radially between the inner stator side and the outer stator side. As in the wind turbine configuration, the inner stator side and the inner rotor core define an inner air gap and the outer stator side and the outer rotor core define an outer air gap Many of the specific rotor construction details are similar to the wind turbine embodiments and are not repeated here. The ship propulsion motor may also include a cooling duct for cooling the motor via passing a liquid cooling medium as shown in FIG. 8 with respect to wind turbine. The cooling duct may be an axial cooling duct in the double-sided stator or alternatively, the cooling duct may be located between at least two adjacent stator coils of a respective stator slot. In a specific example the cooling duct may be located in a plurality of slots of the double-sided stator.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A wind turbine comprising:
    a direct drive wind turbine generator, the generator comprising:
        at least one rotor comprising an inner rotor core comprising at least one first permanent magnet and an outer rotor core comprising at least one second permanent magnet, wherein the outer rotor core is inverted with respect to the inner rotor core; and
        at least one double-sided stator comprising an inner stator side including an inner stator winding disposed about one side of a double-sided lamination stack, an outer stator side including an outer stator winding disposed about an opposing side of the doublesided lamination stack, wherein the at least one double-sided stator is disposed concentrically between the inner rotor core and the outer rotor core and is configured to enable at least a portion of magnetic flux to be shared between the inner stator side and the outer stator side and wherein the at least one rotor and at least one double-sided stator cooperate to produce at least 2.0 megawatts of power.

2. The wind turbine of claim 1, wherein the double-sided lamination stack is configured to enable the magnetic flux to flow radially between the inner stator side and the outer stator side.

3. The wind turbine of claim 2, further comprising a plurality of axial bolts for providing compression of the double-sided lamination stack.

4. The wind turbine of claim 3, wherein the plurality of axial bolts are sufficiently long enough for mounting of the double-sided lamination stack to a stationary frame.

5. A generator for a wind turbine comprising:
   at least one rotor including an inner rotor core and an outer rotor core; and
   at least one double-sided stator comprising an inner stator side including an inner stator winding, an outer stator side including an outer stator winding, the inner stator side and the outer stator side comprising a double-sided lamination stack,
   wherein the at least one double-sided stator is concentrically disposed between the inner rotor core and the outer rotor core of the generator,
   wherein the at least one double-sided stator is configured to enable at least a portion of magnetic flux to be shared between the inner stator side and the outer stator side; and
   further comprising a cooling duct for cooling the wind turbine generator via passing of at least one of cooling air or a liquid cooling medium, wherein the cooling duct comprises an axial cooling duct in the double-sided stator and wherein the cooling duct is located between at least two adjacent stator coils of a respective stator slot.

6. The generator of claim 5, wherein the double-sided lamination stack is configured to enable the magnetic flux to flow radially between the inner stator side and the outer stator side.

7. The generator of claim 5, further comprising a plurality of axial bolts for providing compression of the double-sided lamination stack.

8. The generator of claim 7, wherein the plurality of axial bolts are sufficiently long enough for mounting of the double-sided lamination stack to a stationary frame.

9. A generator for a wind turbine comprising:
   at least one rotor including an inner rotor core and an outer rotor core; and
   at least one double-sided stator comprising an inner stator side including an inner stator winding, an outer stator side including an outer stator winding, the inner stator side and the outer stator side comprising a double-sided lamination stack,
   wherein the at least one double-sided stator is concentrically disposed between the inner rotor core and the outer rotor core of the generator,
   wherein the at least one double-sided stator is configured to enable at least a portion of magnetic flux to be shared between the inner stator side and the outer stator side;
   further comprising a cooling duct for cooling the wind turbine generator via passing of at least one of cooling air or a liquid cooling medium and wherein the cooling duct is located in a plurality of slots of the double-sided stator.

10. A generator for a wind turbine comprising:
    at least one rotor including an inner rotor core and an outer rotor core; and
    at least one double-sided stator comprising an inner stator side including an inner stator winding, an outer stator side including an outer stator winding, the inner stator side and the outer stator side comprising a double-sided lamination stack,
    wherein the at least one double-sided stator is concentrically disposed between the inner rotor core and the outer rotor core of the generator,
    wherein the at least one double-sided stator is configured to enable at least a portion of magnetic flux to be shared between the inner stator side and the outer stator side, and wherein the inner stator side and the inner rotor core define an inner air gap and the outer stator side and the outer rotor core define an outer air gap, and wherein portion of cooling air flows axially through the inner and outer air gap.

11. A wind turbine comprising:
    a wind turbine generator, the generator comprising:
       at least one rotor comprising an inner rotor core and an outer rotor core, wherein the outer rotor core is inverted with respect to the inner rotor core;
       at least one double-sided stator comprising an inner stator side including an inner stator winding, an outer stator side including an outer stator winding, wherein the at least one double-sided stator is configured to enable at least a portion of magnetic flux to be shared between the inner stator side and the outer stator side; and
       a cooling duct for cooling the wind turbine generator via passing of at least one of cooling air or a liquid cooling medium, wherein the cooling duct comprises an axial cooling duct in the double-sided stator and wherein the cooling duct is located between at least two adjacent stator coils of a respective stator slot.

12. A wind turbine comprising:
    a wind turbine generator, the generator comprising:
       at least one rotor comprising an inner rotor core and an outer rotor core, wherein the outer rotor core is inverted with respect to the inner rotor core;
       at least one double-sided stator comprising an inner stator side including an inner stator winding, an outer stator side including an outer stator winding, wherein the at least one double-sided stator is configured to enable at least a portion of magnetic flux to be shared between the inner stator side and the outer stator side; and
       a cooling duct for cooling the wind turbine generator via passing of at least one of cooling air or a liquid cooling medium, wherein the cooling duct is located in a plurality of slots of the double-sided stator.

13. A wind turbine comprising:
    a wind turbine generator, the generator comprising:
       at least one rotor comprising an inner rotor core and an outer rotor core, wherein the outer rotor core is inverted with respect to the inner rotor core;
       at least one double-sided stator comprising an inner stator side including an inner stator winding, an outer stator side including an outer stator winding, wherein the at least one double-sided stator is configured to enable at least a portion of magnetic flux to be shared between the inner stator side and the outer stator side and wherein the inner stator side and the inner rotor core define an inner air gap and the outer stator side and the outer rotor core define an outer air gap, and wherein portion of cooling air flows axially through the inner and outer air gap.

* * * * *